United States Patent [19]

Holly

[11] Patent Number: 4,833,360
[45] Date of Patent: May 23, 1989

[54] SONAR SYSTEM USING ACOUSTICALLY TRANSPARENT CONTINUOUS APERTURE TRANSDUCERS FOR MULTIPLE BEAM BEAMFORMATION

[75] Inventor: Arthur C. Holly, Austin, Tex.

[73] Assignee: Board of Regents The University of Texas System, Austin, Tex.

[21] Appl. No.: 220,412

[22] Filed: Jul. 19, 1988

Related U.S. Application Data

[63] Continuation of Ser. No. 50,942, May 15, 1987, abandoned.

[51] Int. Cl.⁴ .................................. H01L 41/08
[52] U.S. Cl. .................................. 310/334; 310/335; 310/336; 310/800; 73/642; 367/152; 367/155
[58] Field of Search .................. 310/334–337, 310/317, 800; 367/152–157; 73/625, 626, 641, 642, 644

[56] References Cited

U.S. PATENT DOCUMENTS

| | | | |
|---|---|---|---|
| 3,220,248 | 11/1965 | Wood | 310/336 X |
| 3,482,122 | 12/1969 | Lenahan | 310/336 X |
| 3,616,682 | 11/1971 | Golis et al. | 310/336 X |
| 4,295,010 | 10/1981 | Murphy | 179/110 A |
| 4,376,302 | 4/1983 | Miller | 367/157 |
| 4,383,194 | 5/1983 | Ohigashi et al. | 310/326 |
| 4,395,652 | 7/1983 | Nakanishi et al. | 310/800 X |
| 4,412,147 | 10/1983 | Nagura | 36/320 |
| 4,424,465 | 1/1984 | Ohigashi et al. | 310/335 |
| 4,433,400 | 2/1984 | DeReggi et al. | 367/163 |
| 4,437,033 | 3/1984 | Diepers | 310/337 X |
| 4,453,044 | 1/1984 | Murphy | 179/110 A |
| 4,469,920 | 9/1984 | Murphy | 179/110 A |
| 4,486,869 | 12/1984 | Carter | 367/154 |
| 4,549,107 | 10/1985 | Kaneko et al. | 310/800 X |
| 4,570,488 | 2/1986 | Miwa et al. | 73/626 |
| 4,600,855 | 7/1986 | Strachan | 310/800 X |
| 4,651,310 | 3/1987 | Kaneko et al. | 310/800 X |
| 4,656,384 | 4/1987 | Magori | 310/334 |
| 4,677,337 | 6/1987 | Kleinschmidt et al. | 310/334 |
| 4,725,994 | 2/1988 | Kaneko et al. | 310/800 X |
| 4,728,844 | 3/1988 | Wilson et al. | 310/800 X |

FOREIGN PATENT DOCUMENTS

| | | | |
|---|---|---|---|
| 55-30243 | 3/1980 | Japan | 310/800 |
| 0091293 | 2/1983 | Japan | 310/334 |

Primary Examiner—Mark O. Budd
Attorney, Agent, or Firm—Arnold, White & Durkee

[57] ABSTRACT

An acoustic transducer array includes a number of transparent continuous aperture transducer elements which are aimed at various angular sectors in a field of view and are embedded in an acoustically transparent material such as casting resin. Each transducer provides a beamformed output, and the transparency of the elements ensures that each element observes an acoustic field that is unperturbed by the other elements. A high resolution and a wide field of view are obtained by overlapping the transducer elements so that each element captures an increased area of acoustic signal. Preferably, the transducer elements are cut from thin, flexible metalized sheets of voided piezoelectric polymer such as polyvinylidene fluoride or polyvinyl fluoride co-polymer. The polymer transducers are broad band in nature, and permit multiple frequency, multiple beam sonar configurations.

22 Claims, 6 Drawing Sheets

SONAR SYSTEM USING ACOUSTICALLY TRANSPARENT CONTINUOUS APERTURE TRANSDUCERS FOR MULTIPLE BEAM BEAMFORMATION

The Government may have rights in this invention pursuant to a funding agreement under 35 U.S.C. §202 (c)(4).

This is a continuation of co-pending application Ser. No. 050,942 filed on May 15, 1987, now abandoned.

BACKGROUND OF THE INVENTION

1. Technical Field

This invention relates to sonar systems, and more particularly to sonar systems which use a fixed array of transducers to scan selected angular sectors of a field of view.

2. Description of the Related Art

The conventional method of using a fixed array of transducers to scan selected angular sectors is to employ beamforming circuitry which adjusts the relative phase associated with the signal of each of the transducers to obtain phase coherency for acoustic transmission directed along the selected angular sector. The acoustic field is sampled, for example, by discrete and separated piezoelectric ceramic element sensors that are arranged in some convenient geometry. The outputs of these elements are amplified, filtered, and fed to beamformer circuits which delay or phase-shift the signals from the elements by respective amounts, and combine the delayed or phase-shifted signals to provide the beam output. These circuits are replicated to form outputs for multiple beams. The beamforming circuits may be entirely digital in nature and use multiplier accumulator chips, memory chips, and control chips, or they may be analog and use operational-amplifier circuits or bulk delay lines. In some cases, digital and analog hybrid circuits are used. In other cases, charge transfer devices (CTD) or surface acoustic wave (SAW) devices are used as delay line devices.

In general, the multiple beam beamforming circuits comprise a substantial portion of the space and weight resources allocated to the sonar system. In many cases the sonar system, space and weight limitations are rather severe, and therefore a reduction in the capabilities of other sonar subsystem components is required to accommodate the multiple beam beamforming circuits. In some cases the amount of hardware required for the beamforming process dictates tradeoffs which may adversely affect the overall system performance. The beamforming circuits themselves are rather complex and generally require a significant amount of design time and high construction tolerances for a specific implementation. In short, the multiple beam beamformer circuits make the sonar system larger, heavier, and more complex than a specific application may require.

SUMMARY OF THE INVENTION

Accordingly, the primary object of the present invention is to reduce the size, weight and complexity of a sonar system of the kind employing a fixed array of transducer elements.

A specific object of the present invention is to eliminate the need for beamforming circuitry.

Another object of the invention is to provide a fixed transducer array having a directivity pattern free of "grating lobes" which occur in spatially sub-sampled arrays.

Moreover, an object of the invention is to provide a sonar transducer array capable of beamforming over a broad band of frequencies.

To achieve these objects, the present invention uses an array of acoustically transparent transducer elements which are aimed at various angular sectors in a field of coverage, for example, by embedding the elements in an acoustically transparent material. Since the transducer elements are transparent, each element observes an acoustic field that is unperturbed by the other elements. The transparency also permits a high resolution and a wide field of view to be provided by a small transducer array. For this purpose, the transducer elements overlap each other so that each transducer captures a greater area of incident signal than would otherwise be possible.

To provide acoustic transparency, the transducer elements use sheets of a piezoelectric polymer which is impedance matched to the acoustic impedance of the surrounding medium. This impedance preferably approximates the impedance of water in order to avoid impedance mis-match reflections and losses at the interface between the transducer array and the acoustic environment. Piezoelectric polymer has the additional advantage of broad-band reception, and therefore permits multi-frequency multiple beam beamforming. Therefore, the sonar system of the present invention is readily configured for covert operation by using spread-spectrum acoustic signals.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Figure 1:
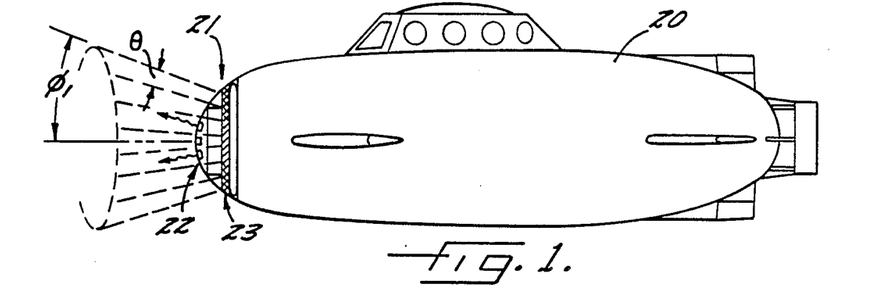
FIG. 1 is a pictorial diagram showing a submarine employing a sonar system according to the present invention.

Turning now to FIG. 1, there is shown a submarine 20 employing a sonar system generally designated 21 according to the present invention. For acoustically illuminating a certain field of view in front of the submarine, the sonar system includes a broad-band acoustic transmitting array 22. The transmitting array 22 includes, for example, a number of piezoelectric ceramic elements mounted on a backing plate. For transmitting, the preferred piezoelectric ceramic is lead zirconate titanate (PZT). The ceramic transducer elements are relatively narrow band in nature, and therefore the transmitter array 22 includes ceramic elements having various thickness for transmitting various frequency components of the broad-band acoustic signal.

Polymer piezoeleotrics such as PVFD which are commercially available at the present time do not have sufficiently high coupling coefficients for use as transmitters. Co-polymers, such as $PVF_2$ and $PVF_3$ mixtures, have higher coupling coefficients and could be useful as transmitters as well as receivers if voided sheets of such materials become commercially available.

For receiving reflections of the transmitted signal from objects within the field of view, the sonar system 21 includes an acoustic receiving array 23. In accordance with an important aspect of the present invention, the receiving array includes a plurality of planar, acoustically transparent transducer elements, each of which is aligned normal to a different respective beam direction within the field of view. The acoustic transparency allows each element to observe an acoustic field that is unperturbed by the other elements. Since each element is aligned normal to a respective beam direction, each element inherently provides a beamformed electrical signal.

In accordance with another aspect of the present invention, the transparent transducer elements overlap each other so that each transducer may capture an increased amount of acoustic signal directed along its beam direction from the field of view. Moreover, due to the increased capture area, the directivity pattern of each element with respect to its beam direction has an increased resolution. The transparent transducer elements are flat and large with respect to the acoustic wavelength in order to provide highly directed beam patterns. The shape of the transducer elements determines the beam width in the two mutually orthogonal directions with respect to the beam direction. As shown in FIG. 1, the receiving array 23 has transducer elements with directivity patterns that are defined with respect to the angles $\theta$, $\phi$. For the sake of illustration, the transducer elements in the array 23 are aligned to provide beam directions having a common angle $\phi_1$ and respective different values for the angle $\theta$. To obtain such a pattern, the elements in the receiving array 23 are disposed in planes which are canted or skewed with respect to each other in a fashion that is analogous to the way that the blades of a windmill are relatively positioned.

Figure 2:
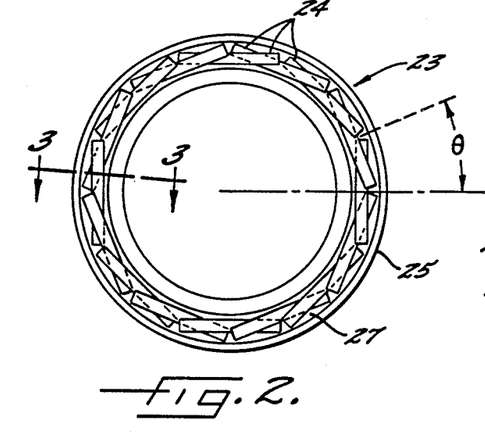
FIG. 2 is a front view of the acoustic transducer array used for receiving sonar signals in the sonar system of FIG. 1.

Turning now to FIG. 2, there is shown a front view of the receiving array 23. The transducer elements 24 are in the form of elongated rectangular strips that overlap each other. For the sake of illustration the array 23 is shown as including sixteen transducer elements 24, although a greater number could be used for a particular application. As will become apparent below, for example, a rectangular transducer element having a length of six inches and a width of one inch provides a half-power beamwidth of approximately 3.5° in the $\theta$ direction and a half-power beamwidth of approximately 20° in the $\phi$ direction at an acoustic frequency of 150 kHz. Therefore, if this size of transducer element were used, the array 23 should include about sixty-four such strips to obtain a uniform coverage over the illustrated field of view. If such an increased number of strips were used, then either the radial dimension of the array of FIG. 2 could be increased relative to the size of the strips, or the additional transducer elements could be overlapped over the transducer elements 24 shown in FIG. 2.

So that the transducer elements 24 are acoustically transparent, they are made of an acoustically transparent material such as a piezoelectric polymer. The preferred piezoelectric polymer is polyvinylidene fluoride (PVDF). The polymer is formed into a sheet, and thin metal films are applied to the surfaces of the sheet in order receive an electrical signal responsive to pressure applied to the sheet. The thin metal films are applied, for example, by a vacuum deposition process. The sheet is then electrically activated or polarized by applying an electric field of about 1 MV/cm while the material is brought to a temperature of about 117° Celcius for about 15 minutes and then is brought back to room temperature. The preparation and use of such piezoelectric polymer material for forming acoustically transparent transducers is further described in DeReggi et al. U.S. Pat. No. 4,433,400 issued Feb. 21, 1984.

Suitably prepared piezoelectric polymer sheets are commercially available from Theorn EMI, Dawley Road, Hayes, Middlesex, UB31HH, Great Britain. The preferred material is 0.6 mm thick, voided and polarized PVFD sheet having copper films applied. This material is flexible and is easily cut to any desired shape by using scissor or a paper cutter. The shape required for a desired beamwidth is calculated by applying continuous aperture theory. Specifically, the beam pattern is approximately related to the Fourier transform of the shape of the transducer element. The voided material is preferably used because the voids lower the acoustic impedance of the piezoelectric polymer to the impedance of water. Therefore, there is no substantial impedance mis-match between the aquatic environment of the sonar system and the transducer which would otherwise cause undesired reflections and los of received signal.

In order to maintain the relative angular orientations of the transducer elements 24 to uniformly cover the field of view, the transducer elements are imbedded in a casting resin. To maintain the transparency of the transducer elements, the acoustic impedance of the casting resin is selected to match the acoustic impedance of the piezoelectric polymer. The preferred casting resin is type PRC 1527 urethane which is commercially available as a potting compound. For use as a potting compound, urethane resin in liquid form is mixed with a catalyst and poured into a mold containing the article to be potted. For forming the transducer array 23 as shown in FIG. 2, an annular mold is used, resulting in the annular mass 24 of polymerized polyurethane into which the transducer elements 25 are imbedded.

Figure 3:
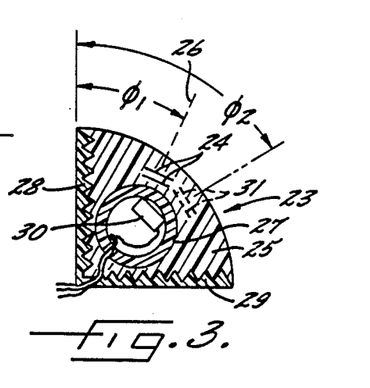
FIG. 3 is a cross-sectional view of the acoustic transducer array of FIG. 2 along line 3—3.

Turning now to FIG. 3, there is shown a cross-section of the transducer array 23 of FIG. 2. So that the transducer elements 24 respond only incident acoustic energy along the beam direction 26, the transducer elements are backed by a cylindrical pipe bent into annular shape (see FIG. 2) which serves to disperse incident acoustic energy passing through the transducers 24. Therefore, according to reciprocity, the transducers 24 are not responsive in a directed fashion to any acoustic energy propagating in a backward fashion along the beam direction 26. The suppression of such backward propagating acoustic energy is further achieved by acoustic dispersion or absorption by means of dispersers or absorbers 28, 29 which line the mounting surfaces of the mass of the polymerized casting resin.

In order to provide dispersion of the acoustic energy, the cylindrical pipe 27 as well as the dispersers 27, 28 are preferably formed of a relatively dense plastic resin such as polyvinylchloride (PVC). The pipe 27 disperses the acoustic energy due to its cylindrical cross-section and its curvature along its axial direction, and the dispersers 28, 29 disperse the acoustic energy due to a wavy, pyramidal or waffle-iron surface at their interface with the mass 25 of casting resin. To provide for acoustic absorption as well as dispersion, the dispersers 28, 29 could be made of an acoustic absorptive material such as fibers, cloth or carpet which has been loaded with wax, for example, by hot dipping or by applying a solution of wax and a solvent such as trichoroethylene.

In addition to providing acoustic dispersion, the plastic pipe 27 provides mechanical rigidity and is preferably used as an enclosure for preamplifiers 30 for the transducer elements 24. Therefore, the preamplifiers may be mounted very close to the transducers for eliminating the pick-up of stray signals and noise, without causing undesired acoustic reflections.

Although FIG. 2 shows transducers 24 having beam directions with a common angle $\phi_1$, it should be readily appreciated that additional transducers 31 could be added as shown in FIG. 3 to provide beam directions at one or more additional angles such as the angle $\phi_2$.

Figure 4:
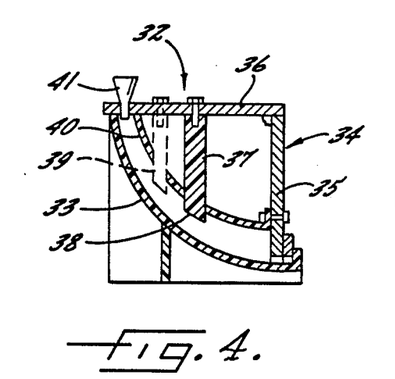
FIG. 4 is a cross-sectional view corresponding to FIG. 3 of a mold for making a resinous casting for aligning the transducer elements of the array in FIG. 2.

Turning now to FIG. 4, there is shown a mold generally designated 32 for casting an initial part of the mass of resin 25 for the purpose of defining locations for receiving the transducer elements in their required relative angular positions. The mold includes, for example, a curved fiberglass structure 33 which defines the forward surface of the mass of casting resin, and a removeable portion generally designated 34 including a section 35 of cylindrical metal pipe welded at right angles to an annular disc-shaped metal plate 36. To the plate 36 are mounted a number of plastic wedges 37 which are rectangular in form and have a flat surface 38 machined into them at a precisely defined angle for defining the positions of the transducer elements. For defining positions for additional transducer elements (such as the elements 31 in FIG. 3) additional wedges 39 may be provided. So that the initial casting does not occupy the space for the pipe 27, the removeable part 34 the mold 32 includes a curved sheet of fiberglass 40 defining a surface of the initial casting spaced from its other curved surface. Liquid casting resin and a catalyst are introduced into the mold via a funnel 41.

Figure 5:
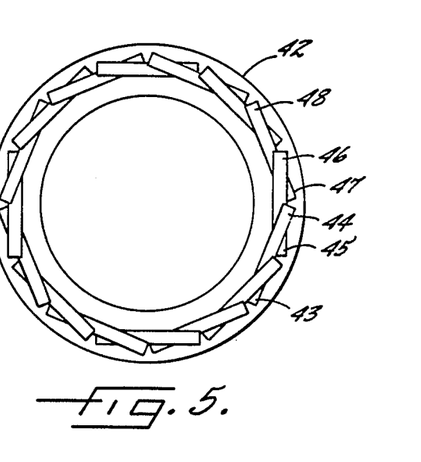
FIG. 5 is a plan view of the casting provided by the mold in FIG. 4.

The initial casting 42 is shown in FIG. 5. The wedges (37 in FIG. 4) provide depressed regions which have relatively skewed flat surfaces 43–48 for receiving the transducer elements (24 in FIG. 2). The surfaces 43 and 44, for example, lie in the same plane into which a first transducer element is laid. Then, a second transducer element is laid on the surfaces 44 and 46. The next transducer element is laid on the surfaces 46 and 48, and so on until all of the transducer elements are received in the initial casting 46. Before being placed in the initial casting 42, the elements are coated with a film of liquid casting resin mixed with catalyst so that the transducer elements become adhesively bonded to the initial casting 42. Then, the initial casting 42 is placed back into the lower part 33 of the mold 32 of FIG. 4, to finish the casting of the entire mass 25 of resin.

Figure 6:
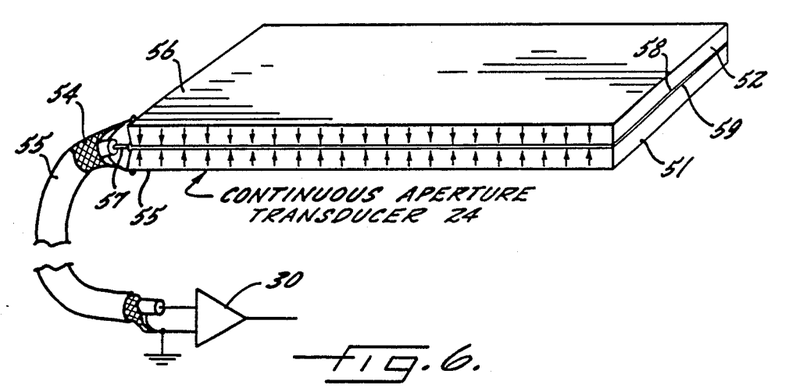
FIG. 6 is a pictorial diagram of a transducer element which is configured for eliminating the pick-up of stray electrical signals.

Turning now to FIG. 6, there is shown a pictorial diagram of a transducer element 24 fabricated by adhesively bonding together two rectangular strips 51, 52 of the commercially available PVFD material. After cutting the strips 51, 52, one is inverted with respect to the other before adhesive bonding, so that the strips are connected with opposing polarization as illustrated by the arrows.

For connecting the transducer 24 to a corresponding preamplifier 30, there is provided a shielded coaxial cable 53 having a braided shield 54 which is connected, for example by sodering, to the copper films 55, 56 on the external faces of the transducer 24. For receiving the signal from the transducer 24, the cable 53 includes a central conductor 57 which is soldered to the metal films 58, 59 in the middle of the transducer 44. Therefore, the middle metal films 58, 59 are electrostatically shielded by the outer films 55, 56 from external electrostatic disturbances. The preamplifier 30 preferably uses a field effect transistor to provide a high input impedance and low noise amplification.

Figure 7:
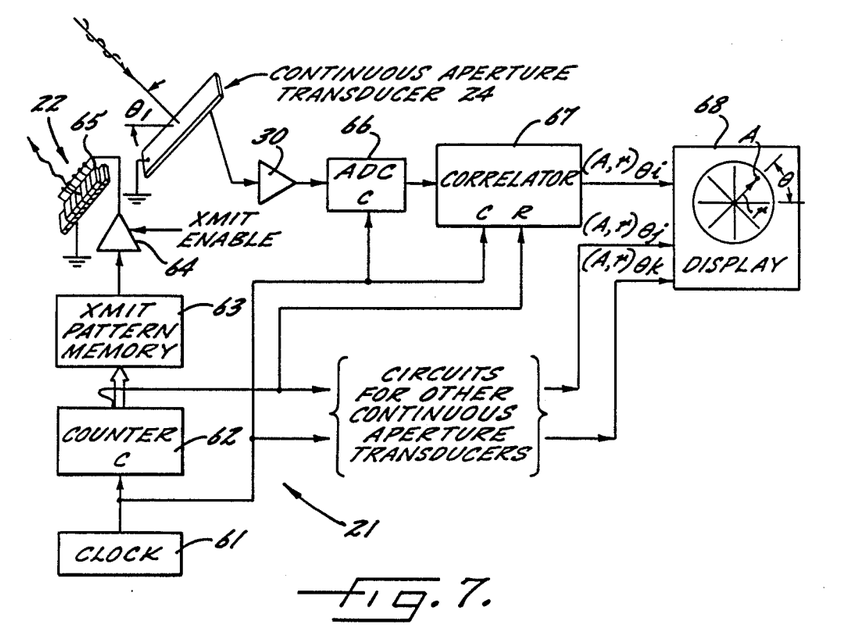
FIG. 7 is a block diagram of a sonar system employing the present invention.

Turning now to FIG. 7, there is shown a block diagram of the signal processing circuits of the kind used with the transducer array 23 and the sonar system of FIG. 1. As will be further described below, the transducer elements 24 have an extremely wideband response, and therefore the sonar system may transmit an extremely wide bandwidth signal, such as a pseudorandom code. A pseudorandom code enables noise and interference to be rejected when the code is received and detected by correlation. For secure operation of the sonar system, the pseudorandom code is transmitted continuously at a relatively low acoustic level so that it is essentially masked by background noise unless the code is available for detection by correlation.

In order to excite the transducer 22 with a broadband signal such as a pseudorandom code, the sonar system includes a clock 61 oscillating at a high rate, for example at one megahertz, which clocks a counter 62. The counter addresses a transmit pattern memory 63 which includes a prestored binary pseudorandom code or other representation of an acoustic signal to be transmitted. Transmission occurs when a relatively high voltage amplifier 64 is enabled to excite the ceramic elements 65 in the acoustic transmitter 22 in response to the pattern read from the memory 64. Reflected acoustic signals are received in each of the continuous aperture transducers 24 aligned normal to the different respective beam directions. For each transducer 24 the receive signal is amplified in a preamplifier 30. Preferably the received signal is further processed in digital form, and for this purpose the received signal is sampled by an analog-to-digital converter (ADC) 66. The analog-to-digital converter 66 converts the sampled analog signal to a number for each sample.

To detect the presence of reflections in the received signal, the sequence of numbers from the analog-to-digital converter is fed to a digital correlator 67 which correlates the received signal with one or more pre-stored patterns corresponding to the transmitted signal. The result is a series of amplitudes A for the respective ranges r at the beam direction $\theta_i$ for the transducer 24. When displayed in polar coordinates by a display device 68, the amplitudes A indicate the presence of reflecting objects at their respective ranges r and angles $\theta$.

The digital correlator 67 can be implemented in various ways, for example, by high speed processors which execute a fast Fourier transform procedure, and correlate by a complex multiplication of the Fourier transform with a prestored transform of the transmitted code, and a computation of the inverse transform of the complex product.

Alternatively, the digital correlator 67 could be implemented as an array of identical CMOS LSI integrated circuits operating at the relatively low speed of the clock 61. Each integrated circuit would directly compute the correlation for a group of similar ranges r, and would include a programmable memory storing data representing a quantized version of a typical signal received for the group of ranges, and a counter addressing the memory and reset and clocked in synchronism with the counter 62 of FIG. 7. Each integrated circuit would also include for each range r a respective accumulator register for accumulating the correlation for the range, and an arithmetic logic unit for selectively adding the numeric value of the received signal to the accumulated value and storing the sum in the accumulator register. The arithmetic logic unit would be controlled by an output of the programmable memory. The arithmetic logic unit, for example, could be controlled by a respective three bits read from the programmable memory for the respective range r, a first bit indicating whether zero should be added to the accumulated value, a second bit indicating whether the received signal sample should be complemented, and a third bit indicating whether the received signal sample should be arithmetically right shifted by one binary place. In other words, the three bits read from the programmable memory represent the values $(-1, -\frac{1}{2}, 0, \frac{1}{2}, 1)$ which are effectively multiplied by the received signal sample, and the product is accumulated in the accumulator. So that a single programmable memory can be read once to provide different respective values for the different ranges, each of the three bits read from the memory for each clock cycle is clocked into a respective shift register which provides respective outputs $Q_1, Q_2, \ldots Q_n$ for the ranges $r_1, r_2, \ldots r_n$. Therefore an address A provides respective bit values $C_1, C_2, \ldots C_n$ for the ranges $r_1, r_2, \ldots r_n$; and an address $(A+1)$ provides respective values $C_0, C_1, \ldots C_{n-1}$ for the ranges $r_1, r_2, \ldots r_n$. Each accumulator register should be resettable upon receipt of the reset signal, and should be provided with a correlation output register strobed on the rising edge of the reset signal for receiving the accumulated value of the correlation.

Figure 8:
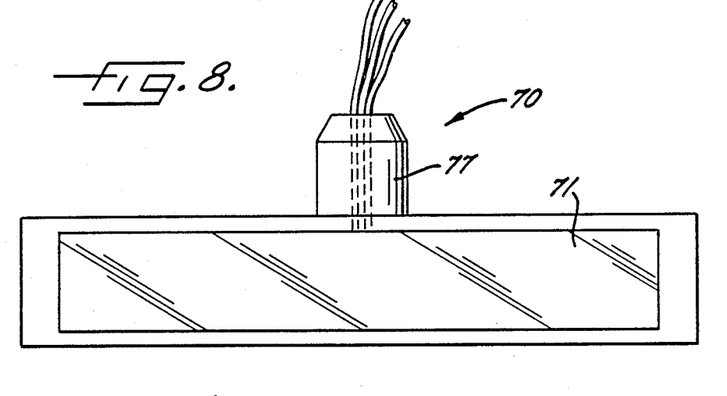
FIGS. 8, 9 and 10 are respective front, side and bottom views of a test prototype transducer according to the present invention.
Figure 9:
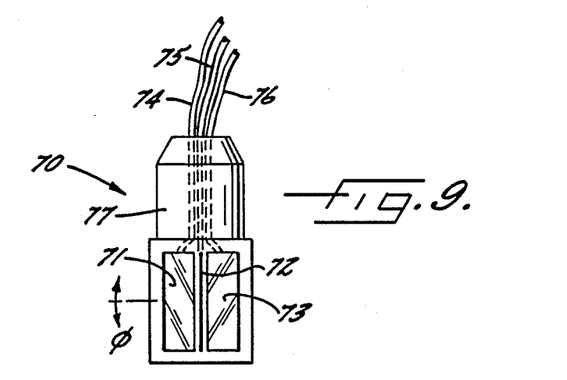
Figure 10:
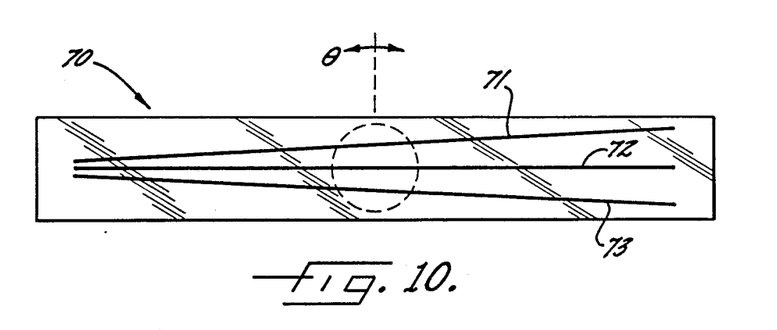

The feasibility of the sonar system described in FIGS. 1-7 has been demonstrated by the construction and evaluation of a test prototype transducer 70 shown in FIGS. 8, 9 and 10. The test prototype transducer was built with three continuous aperture transducer elements made of 0.6 mm thick, copper plated and voided PVFD material for operating in a hydrostatic mode. Using a paper cutter the PVDF material was cut into three one-inch by six-inch strips providing the three transducer elements 71, 72, 73. Electrical connections to the transducer elements were made by soldering the center and shield leads of respective signal cables 74, 75, 76 to the copper films on the transducer elements.

In order to align the transducer elements normal to different respective beam directions, a number of small polyurethane spacers were made from type PRC 1527 urethane potting compound. Using these spacers, the transducer elements were aligned in a rectangular mold so as to be 0.125 inches from the bottom of the mold and so that the adjacent transducers were canted by three degrees with respect to each other as shown in FIGS. 8 and 10. The mold was then filled with a mixture of the polyurethane liquid resin and a catalyst, which caused the urethane to polymerize and harden in the shape shown in FIGS. 8-10.

Figure 11:
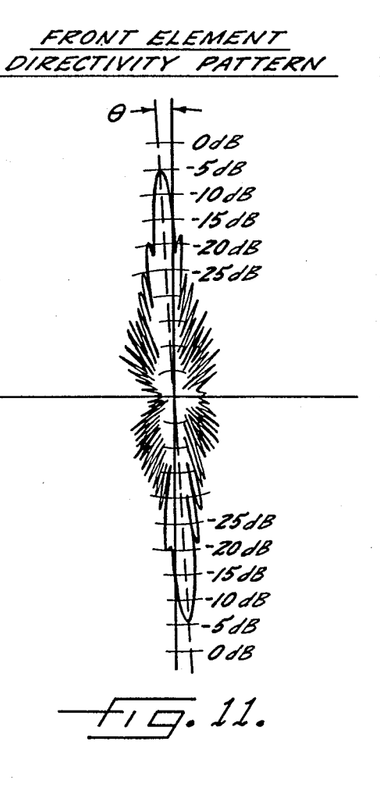
FIGS. 11, 12 and 13 are respective directivity patterns about an angle $\theta$ for the front, center, and back transducer elements of the test prototype transducer of FIGS. 8, 9 and 10.
Figure 12:
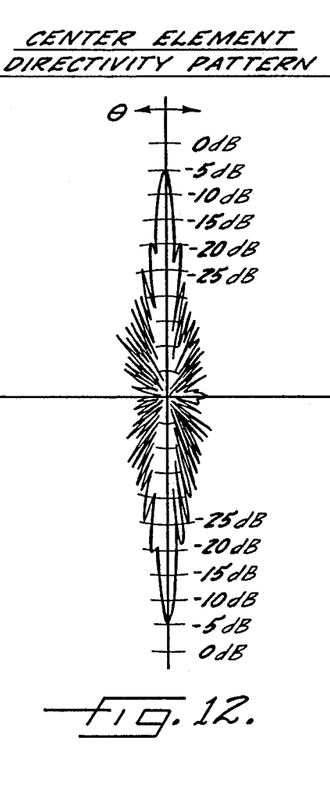
Figure 13:
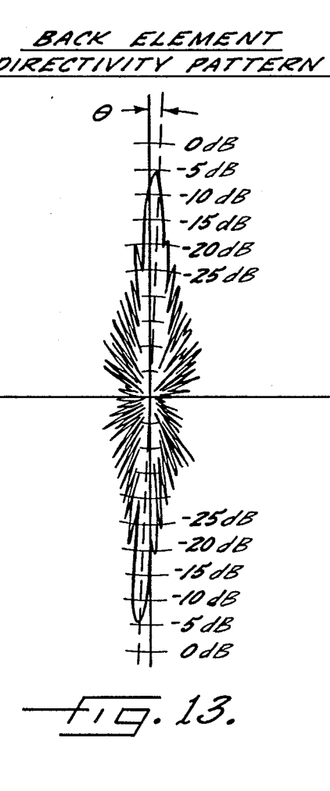

With twenty feet of signal cable attached to the prototype transducer 70, it was calibrated to determine its directivity patterns and sensitivity. The results of the calibration are shown in FIGS. 11-15. FIGS. 11, 12 and 13 show the directivity patterns of the respective transducer elements with respect to the angle $\theta$ for an acoustic frequency of 150 kHz. These directivity patterns are substantially symmetrical in the forward and backward sector and have a half-power beamwidth of approximately 3.5° and a first secondary lobe level at about $-13.5$ db relative to the main peak. In theory, the six-inch aperture of the transducer elements should yield a beamwidth of 3.3° and a secondary lobe level of $-13.5$ db. The difference between theory and the measured beamwidth is within the resolution of the measuring devices that were used. The center element exhibited a forward beam substantially perpendicular to the longitudinal axis of the prototype transducer, and the front and back elements had beam patterns canted roughly 2.5° from the central beam. The difference between the 3° canting angle between the transducer elements and the 2.5° canting angle of the respective directivity patterns apparently was caused by a combination of construction inaccuracies and refraction of the acoustic beam in going from water to the urethane potting block. The 1.5 dB reduction in signal level of the back transducer element is possibly an interference effect associated with minor reflections due to a small difference in acoustic impedance between the potting compound and water.

Figure 14:
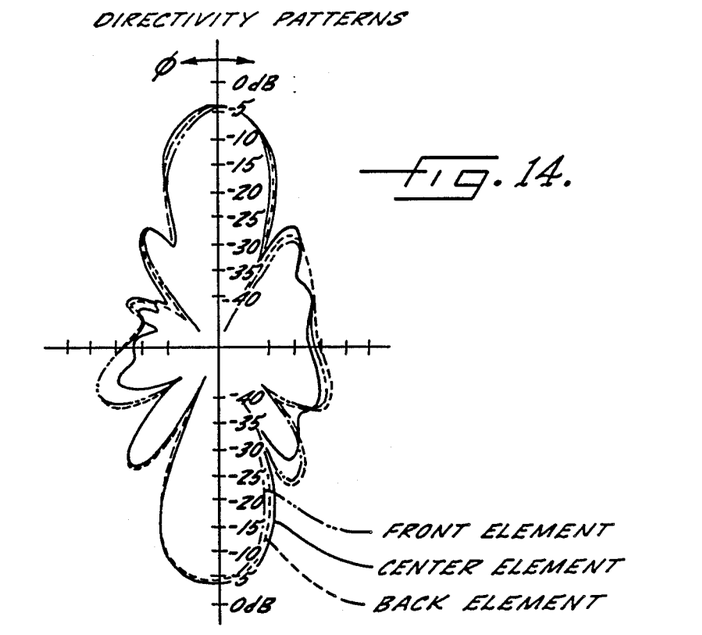
FIG. 14 shows directivity patterns about an angle $\phi$ for the front, center and back elements of the test prototype transducer.

FIG. 14 shows a composite plot of the respective directivity patterns of the transducer elements in the $\phi$ direction at an acoustic frequency of 150 kHz. The half power beamwidths are roughly 20°, which represents the theoretical value for the one-inch aperture. The first secondary side lobe levels are more varied amongst the three plots, due to the presence of the signal cables and the extension 77 of potting compound around them (see FIGS. 8 and 9). None of the first secondary side lobe levels, however, is greater than $-14$ dB relative to the main lobe, which should be compared to the theoretical level of −3.5 dB.

Figure 15:
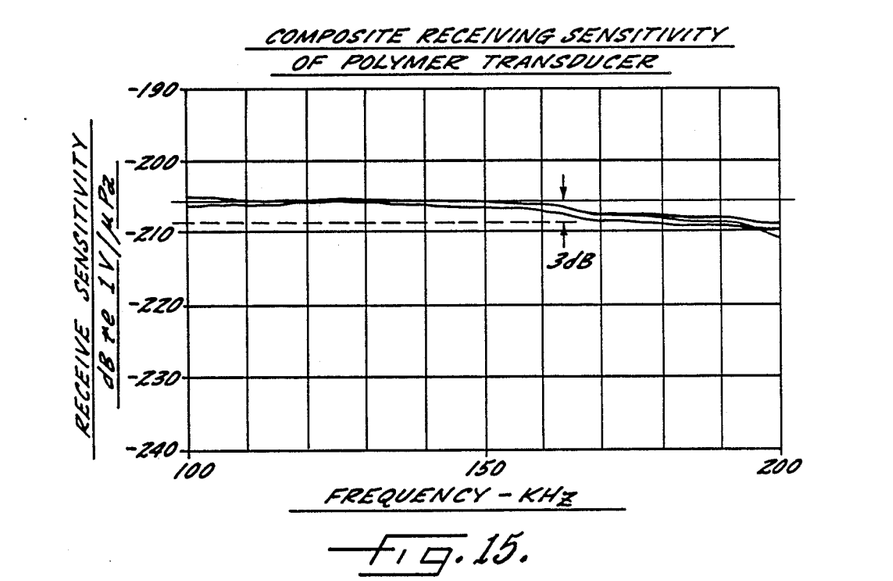
FIG. 15 is a graph of the composite receiving sensitivity of the test prototype transducer.

The composite receiving sensitivity of the transducer element is graphed in FIG. 15 as a function of frequency. The three transducer elements differ in sensitivity by no more than 1.5 dB throughout the measurement range of 100 to 200 kHz. At 150 kHz, the sensitivity is roughly −206 dB re 1 V/uPa. This sensitivity measurement includes cable losses due to the capacitance of the 20 foot cable. By placing a preamplifier close to the transducer elements, the sensitivity should be increased to a theoretical value of −198 dB re 1 V/uPa. As is evident from FIG. 7, the sensitivity is relatively uniform over a wide range of frequencies.

Figure 16:
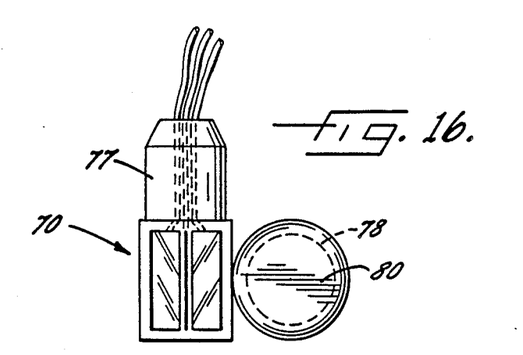
FIGS. 16 & 17 are respective side and bottom views showing the use of a length of plastic pipe in back of the test prototype transducer to suppress the rear lobe of the directivity patterns of the transducer.
Figure 17:
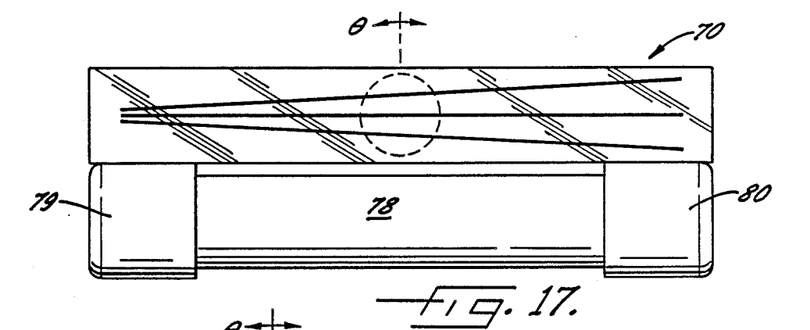
Figure 18:
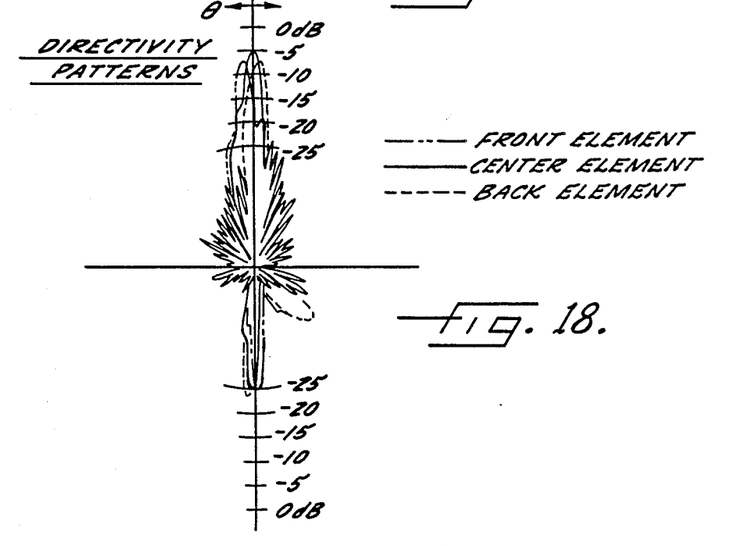
FIG. 18 shows the directivity patterns obtain with the transducer arrangement of FIGS. 16 and 17.

Turning now to FIGS. 16 and 17, there is shown an arrangement using a plastic pipe 7 for suppression of the rear lobes of the directivity patterns. The plastic pipe 78 was one-inch in diameter and was provided with end caps 79 and 80 having a slightly greater diameter. The plastic pipe, in the form of a cylinder, acts to scatter, and hence suppress, acoustic energy arriving from the backward direction. At the same time, it may provide a convenient housing for a preamplifer. The directivity patterns for the transducer elements in the θ direction at 150 kHz is shown in FIG. 18. From the directivity patterns, it is evident that the backlobe is indeed suppressed by roughly 20 dB which is acceptable for normal sonar applications. No change is observed in sensitivity; however, the center beam is slightly more sensitive than the outer beams due to lineal reflections from the length dimension of the plastic pipe.

In view of the above, there has been described a sonar system of a kind employing a fixed array of transducer elements in which the elements themselves provide beamformed outputs, thereby eliminating the need for beamforming circuitry. The continuous aperture transducer has a directivity pattern free of "grating lobes" which occur in spatially sub-sampled arrays. Moreover, the response form such a continuous aperture transducer made of piezoelectric polymer has an extremely wide broad-band frequency response and is therefore capable of beamforming over a broad band of frequencies. As described above, this broad-band beamforming may be used for receiving a continuously transmitted pseudorandom acoustic signal.

It should be noted that the present invention is susceptible to many variations to suit particular applications. Instead of embedding the entire transducer array in a single mass of casting resin, large arrays of transducer elements can be formed by combining smaller units, each unit including a number of transducer elements embedded in casting resin. Because the polymer transducers are thin and flexible as well as transparent, individual thinly potted units may be attached conformally to irregular shapes and stacked one on top of another. Moreover, the transducer elements, or potted units, could be immersed in a liquid such as oil instead of potting them together.

What is claimed is:

1. An acoustic transducer array for providing a certain field of view in a sonar system, said transducer array comprising a unitary mass of casting resin, and a plurality of flat planar transducer elements imbedded in said unitary mass of casting resin, each of said transducer elements including a flat planar sheet of piezoelectric polymer, the planar sheets each being aligned normal to respective different beam directions included in said field of view, and said casting resin having an acoustic impedance approximately matching the acoustic impedance of said piezoelectric polymer, so that each transducer element is substantially acoustically transparent in said mass of casting resin and responds to an acoustic field that is substantially unperturbed by the other transducer elements.

2. The acoustic transducer array as claimed in claim 1, wherein said transducer elements are overlapping such that each transducer element and at least one nearest neighboring transducer element closest to said transducer element in said array have respective beam directions which are different by a small angle, and rays from said field of view and directed along the beam direction of each transducer element intersect substantial portions of both said transducer element and its said nearest neighboring transducer element in said array.

3. The acoustic transducer array as claimed in claim 2, wherein pairs of overlapping ones of said transducer elements are canted with respect to each other at substantially the same angle.

4. The acoustic transducer array as claimed in claim 1, further comprising means for dispersing acoustic energy having passed through said transducer elements along said beam directions.

5. The acoustic transducer array as claimed in claim 4, wherein said means for dispersing comprises an enclosure for an amplifier responsive to an electrical signal from one of said transducer elements.

6. The acoustic transducer array as claimed in claim 1, wherein the acoustic impedance of said casting resin approximately matches the acoustic impedance of water.

7. The acoustic transducer array as claimed in claim 1, wherein said casting resin includes polyurethane.

8. The acoustic transducer as claimed in claim 1, wherein said piezoelectric polymer includes polyvinylidene fluoride.

9. The acoustic transducer as claimed in claim 1, wherein said piezoelectric polymer is voided.

10. An acoustic transducer array for providing a certain field of view in a sonar system, said transducer array comprising a plurality of flat planar transducer elements each including a flat planar sheet of piezoelectric polymer, and means for aligning the planar sheets normal to respective different beam directions included in said field of view, wherein said sheets are substantially acoustically transparent so that each transducer element has an acoustic response that is substantially unperturbed by the other transducer elements and wherein said transducer elements are overlapping such that each transducer element and at least one nearest neighboring transducer element closest to said transducer element in said array have respective beam directions which are different by a small angle, and rays from said field of view and directed along the beam direction of each transducer element intersect substantial portions of both said transducer element and its said nearest neighboring transducer element in said array.

11. The acoustic transducer array as claimed in claim 10, wherein the transducer elements are canted at substantially the same angle with respect to their nearest neighboring elements.

12. The acoustic transducer array as claimed in claim 11, further comprising means for dispersing acoustic energy having passed through the overlapped transducer elements.

13. The acoustic transducer array as claimed in claim 12, wherein said means for dispersing comprises an enclosure for an amplifier responsive to an electrical signal from one of said transducer elements.

14. The acoustic transducer array as claimed in claim 10, wherein said means for aligning comprises a polymerized mass of synthetic resin in which said transducer elements are imbedded.

15. The acoustic transducer array as claimed in claim 14, wherein said polymerized mass of synthetic resin includes polyurethane.

16. The acoustic transducer array as claimed in claim 10, wherein said piezoelectricpolymer includes polyvinylidene fluoride.

17. The acoustic transducer array as claimed in claim 10, wherein said piezoelectric polymer is voided.

18. A sonar system comprising a broadband acoustic transmitter for acoustically illuminating a field of view, means for generating a broadband signal for exciting said broadband acoustic transmitter, a broadband acoustic transducer array for receiving acoustic reflections from said field of view, and means for correlating signals from said broadband acoustic transducer array with said broadband signal to sense the presence of reflecting objects and their angular positions and ranges within said field of view, wherein said broadband acoustic transducer array comprises a plurality of acoustically transparent, flat planar piezoelectric elements, and means for aligning said elements normal to respective different beam directions covering said field of view, said elements overlapping each other and providing respective electrical signals indicating acoustic reflections received along the respective beam directions, such that each transducer element and at least one nearest neighboring transducer element closest to said transducer element in said array have respective beam directions which are different by a small angle, and rays from said field of view and directed along the beam direction of each transducer element intersect substantial portions of both said transducer element and its said nearest neighboring transducer element in said array.

19. The sonar system as claimed in claim 18, wherein said means for correlating includes respective means for correlating the electrical signal from each piezoelectric element with said broadband signal to determine the presence and range of objects in said field of view at the respective beam direction of the piezoelectric element.

20. The sonar system as claimed in claim 18, wherein said piezoelectric elements are comprised of a piezoelectric polymer and said means for aligning comprises a unitary mass of casting resin into which said piezoelectric elements are imbedded.

21. A sonar system comprising:
a broadband acoustic transmitter for acoustically illuminating a field of view;
means for generating a broadband signal for exciting said broadband acoustic transmitter;
a broadband acoustic transducer array for receiving acoustic reflections from said field of view, said broadband acoustic transducer array comprising a plurality of acoustically transparent, flat planar piezoelectric transducer elements imbedded in a mass of casting resin and aligned normal to respective different beam directions covering said field of view, said transducer elements overlapping each other such that each transducer element and at least one nearest neighboring transducer element closest to said each transducer element in said array have respective beam directions which are different by a small angle, and rays from said field of view and directed along the beam direction of said each transducer element intersect substantial portions of both said each transducer element and its said nearest neighboring transducer element in said array, each transducer element providing a respective electrical signal indicating acoustic reflections directed along the respective beam direction normal to said each transducer element; and
means for correlating each respective electrical signal from each transducer element with said broadband signal to provide a respective indication of the presence and range of a reflecting object in said field of view at said beam direction normal to said each transducer element.

22. A method of sensing the presence of reflecting objects in a field of view of a broadband acoustic transduce array comprising a plurality of acoustically transparent, flat planar piezoelectric transducer elements and means for aligning said transducer elements normal to respective different beam directions covering said field of view, said transducer elements overlapping each other such that each transducer element and at least one nearest neighboring transducer element closest to said each transducer element in said array have respective beam directions which are different by a small angle, and acoustic reflections from said field of view and directed along the beam direction of each transducer element intersect substantial portions of both said each transducer element and its said nearest neighboring transducer element in said array, each transducer element providing a respective electrical signal indicating acoustic reflections directed along the respective beam direction normal to said each transducer element;
said method comprising the steps of:
(a) illuminating said field of view with an acoustic signal; and
(b) correlating each respective electrical signal from each transducer element with said acoustic signal to provide a respective indication of the presence and range of said reflecting objects in said field of view at said beam direction normal to said each transducer element.

* * * * *

UNITED STATES PATENT AND TRADEMARK OFFICE
CERTIFICATE OF CORRECTION

PATENT NO. : 4,833,360
DATED : May 23, 1989
INVENTOR(S) : Holly

It is certified that error appears in the above-identified patent and that said Letters Patent are hereby corrected as shown below:

```
Column 1, line 45, change "system," to --system's--.
Column 4, line 49, change "Theorn" to --Thorn--.
Column 5, line 17, after "into" insert --an--.
Column 6, line 40, change "44" to --24--.
Column 7, in each of lines 18, 21, 33, 39 and 44,
     change "r" to --r--.
Column 9, line 2, change "-3.5" to -- -13.5--, and in line 16,
     change "7" to --78--.
```

Signed and Sealed this

Thirteenth Day of February, 1990

Attest:

JEFFREY M. SAMUELS

*Attesting Officer*   *Acting Commissioner of Patents and Trademarks*